United States Patent
Hu et al.

(10) Patent No.: US 10,852,987 B2
(45) Date of Patent: *Dec. 1, 2020

(54) METHOD TO SUPPORT HASH BASED XCOPY SYNCHRONOUS REPLICATION

(71) Applicant: EMC IP Holding Company LLC, Hopkinton, MA (US)

(72) Inventors: Ying Hu, Northborough, MA (US); Xiangping Chen, Sherborn, MA (US); Yuval Harduf, Yehud (IL); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,303

(22) Filed: Jan. 27, 2020

(65) Prior Publication Data

US 2020/0159414 A1     May 21, 2020

Related U.S. Application Data

(63) Continuation of application No. 16/177,782, filed on Nov. 1, 2018, now Pat. No. 10,613,793.

(51) Int. Cl.
    *G06F 3/06*      (2006.01)
    *G06F 11/14*      (2006.01)
    *G06F 16/901*      (2019.01)

(52) U.S. Cl.
    CPC ............. *G06F 3/065* (2013.01); *G06F 3/067* (2013.01); *G06F 3/0614* (2013.01); *G06F 11/1446* (2013.01); *G06F 16/9014* (2019.01)

(58) Field of Classification Search
    CPC ................. G06F 3/0647; G06F 11/203; G06F 11/1446–1469; G06F 116/119; G06F 116/214; G06F 2201/84
See application file for complete search history.

(56) References Cited

U.S. PATENT DOCUMENTS

| | | |
|---|---|---|
| 6,496,908 B1 | 12/2002 | Kamvysselis et al. |
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |

(Continued)

OTHER PUBLICATIONS

U.S. Appl. No. 15/001,789, filed Jan. 20, 2016, Meiri et al.

(Continued)

*Primary Examiner* — Nicholas J Simonetti
(74) *Attorney, Agent, or Firm* — Daly, Crowley Mofford & Durkee, LLP (57) ABSTRACT

In one aspect, support for hash based xcopy replication for synchronous replication is provided. An aspect includes determining, in response to an xcopy command, whether a source logical unit (LU) and a target LU are in active synchronous replication to the same target site. Upon determining that the LUs are in active synchronous replication, increasing a count of a hash handle list, obtaining a unique full hash digest, and sending the digest with volume replication pairing identifier, offset, and length to the target. Upon receiving a request from the source, searching, by the target, for local hash handles of the digest; and upon determining the local hash handles exist in the digest, incrementing, the reference counter handle list, and sending corresponding hash handles from the source site to the target.

20 Claims, 8 Drawing Sheets

(56) References Cited

U.S. PATENT DOCUMENTS

| | | |
|---|---|---|
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,475,124 B2 | 1/2009 | Jiang et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,327,103 B1 | 12/2012 | Can et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,380,928 B1 | 2/2013 | Chen et al. |
| 8,429,346 B1 | 4/2013 | Chen et al. |
| 8,468,180 B1 | 6/2013 | Meiri et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,578,204 B1 | 11/2013 | Ortenberg et al. |
| 8,583,607 B1 | 11/2013 | Chen et al. |
| 8,600,943 B1 | 12/2013 | Fitzgerald et al. |
| 8,677,087 B2 | 3/2014 | Meiri et al. |
| 8,683,153 B1 | 3/2014 | Long et al. |
| 8,694,700 B1 | 4/2014 | Natanzon et al. |
| 8,706,959 B1 | 4/2014 | Arnon et al. |
| 8,712,976 B1 | 4/2014 | Chen et al. |
| 8,719,497 B1 | 5/2014 | Don et al. |
| 8,725,692 B1 | 5/2014 | Natanzon et al. |
| 8,732,124 B1 | 5/2014 | Arnon et al. |
| 8,775,388 B1 | 7/2014 | Chen et al. |
| 8,782,324 B1 | 7/2014 | Chen et al. |
| 8,782,357 B2 | 7/2014 | Halstead et al. |
| 8,799,601 B1 | 8/2014 | Chen et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,909,887 B1 | 12/2014 | Armangau et al. |
| 8,914,596 B2 | 12/2014 | Lecrone et al. |
| 8,930,746 B1 | 1/2015 | Chen et al. |
| 8,954,699 B1 | 2/2015 | Chen et al. |
| 8,966,211 B1 | 2/2015 | Arnon et al. |
| 8,977,812 B1 | 3/2015 | Chen et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,104,326 B2 | 8/2015 | Frank et al. |
| 9,110,693 B1 | 8/2015 | Meiri et al. |
| 9,152,336 B1 | 10/2015 | Chen et al. |
| 9,208,162 B1 | 12/2015 | Hallak et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,418,131 B1 | 8/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,483,355 B1 | 11/2016 | Meiri et al. |
| 9,513,814 B1 | 12/2016 | Can et al. |
| 9,524,220 B1 | 12/2016 | Veprinsky et al. |
| 9,529,545 B1 | 12/2016 | Bono et al. |
| 9,542,125 B1 | 1/2017 | Chen |
| 9,558,083 B2 | 1/2017 | LeCrone et al. |
| 9,594,514 B1 | 3/2017 | Bono et al. |
| 9,606,739 B1 | 3/2017 | LeCrone et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,753,663 B1 | 9/2017 | LeCrone et al. |
| 9,811,288 B1 | 11/2017 | Chen et al. |
| 9,817,766 B1 | 11/2017 | Si et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,037,369 B1 | 7/2018 | Bono et al. |
| 10,055,161 B1 | 8/2018 | Meiri et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,152,527 B1 | 12/2018 | Meiri et al. |
| 10,176,046 B1 | 1/2019 | Hu et al. |
| 10,235,066 B1 | 3/2019 | Chen et al. |
| 10,238,487 B2 | 3/2019 | Alon et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,635 B1 | 6/2019 | Meiri |
| 10,324,640 B1 | 6/2019 | Chen et al. |
| 10,324,806 B1 | 6/2019 | Kucherov et al. |
| 10,331,350 B1 | 6/2019 | Kucherov et al. |
| 10,338,851 B1 | 7/2019 | Kronrod et al. |
| 10,353,616 B1 | 7/2019 | Tao et al. |
| 10,359,965 B1 | 7/2019 | Stronge et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,409,520 B1 | 9/2019 | Meiri et al. |
| 10,437,855 B1 | 10/2019 | Stronge et al. |
| 10,459,632 B1 | 10/2019 | Chen et al. |
| 10,459,883 B1 | 10/2019 | Meiri et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,503,609 B1 | 12/2019 | Stronge et al. |
| 10,534,547 B2 | 1/2020 | Meiri et al. |

(56) References Cited

U.S. PATENT DOCUMENTS

| | | |
|---|---|---|
| 10,565,058 B1 | 2/2020 | Meiri et al. |
| 10,613,793 B1 | 4/2020 | Hu et al. |

OTHER PUBLICATIONS

U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.
U.S. Appl. No. 16/521,728, filed Jul. 25, 2019, Meiri et al.
U.S. Appl. No. 16/521,730, filed Jul. 25, 2019, Meiri et al.
U.S. Appl. No. 16/516,670, filed Jul. 19, 2019, Kucherov et al.
U.S. Appl. No. 16/517,677, filed Jul. 19, 2019, Meiri et al.
U.S. Appl. No. 16/747,169, filed Jan. 20, 2020, Chen et al.
Notice of Allowance dated Dec. 10, 2019 for U.S. Appl. No. 16/177,782; 19 Pages.
312 Amendment dated Dec. 10, 2019 for U.S. Appl. No. 16/177,782; 3 Pages.
U.S. Appl. No. 15/499,943, filed Apr. 28, 2017, Kucherov et al.
U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.

METHOD TO SUPPORT HASH BASED XCOPY SYNCHRONOUS REPLICATION

BACKGROUND

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to support hash based xcopy replication for synchronous replication between a source site and a target site. The method includes, upon receiving an xcopy command at the source site from an initiator, determining whether both the source site logical unit (LU) and the target site LU are in active synchronous replication to the same target site. Upon determining that the source site LU and the target site LU are in active synchronous replication to the same target site, the method includes increasing, by the source system, a reference count of a hash handle list, obtaining, by the source site, a global unique full hash digest, and sending by the source site, the full hash digest with volume replication pairing identifier, offset, and length to the target site. Upon receiving a request from the source site, the method further includes searching, by the target site, for local hash handles of the full hash digest, and upon determining the local hash handles exist in the full hash digest, incrementing, by the target site, the reference counter of the hash handles, and sending corresponding hash handles from the source site to the target site.

Another aspect may provide a system to support hash based xcopy replication for synchronous replication between a source site and a target site. The system includes a memory having computer-executable instructions. The system also includes a processor operated by a storage system. The processor executes the computer-executable instructions. When executed by the processor, the computer-executable instructions cause the processor to perform operations. The operations include, upon receiving an xcopy command at the source site from an initiator, determining whether both the source site logical unit (LU) and the target site LU are in active synchronous replication to the same target site. Upon determining that the source site LU and the target site LU are in active synchronous replication to the same target site, the operations include increasing, by the source system, a reference count of a hash handle list, obtaining, by the source site, a global unique full hash digest, and sending by the source site, the full hash digest with volume replication pairing identifier, offset, and length to the target site. Upon receiving a request from the source site, the operations further include searching, by the target site, for local hash handles of the full hash digest, and upon determining the local hash handles exist in the full hash digest, incrementing, by the target site, the reference counter of the hash handle list, and sending corresponding hash handles from the source site to the target site.

Another aspect may provide a computer program product embodied on a non-transitory computer readable medium. The computer program product includes instructions that, when executed by a computer at a storage system, causes the computer to perform operations. The operations include upon receiving an xcopy command at the source site from an initiator, determining whether both the source site logical unit (LU) and the target site LU are in active synchronous replication to the same target site. Upon determining that the source site LU and the target site LU are in active synchronous replication to the same target site, the operations include increasing, by the source system, a reference count of a hash handle list, obtaining, by the source site, a global unique full hash digest, and sending by the source site, the full hash digest with volume replication pairing identifier, offset, and length to the target site. Upon receiving a request from the source site, the operations further include searching, by the target site, for local hash handles of the full hash digest, and upon determining the local hash handles exist in the full hash digest, incrementing, by the target site, the reference counter of the hash handle list, and sending corresponding hash handles from the source site to the target site.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide a technique for supporting hash based xcopy replication iterative data verifications for synchronous replication between a source site and a target site.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "IO request" or simply "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., IO data) issued to a storage system, which may be used to maintain a duplicate storage system, and to roll back the duplicate storage system to a previous point in time. In some embodiments, each entry in a journal contains, apart from the IO data itself, IO metadata that can include information such as a volume identifier (ID), the IO block offset within the volume, the IO length, and a time stamp of the IO.

In certain embodiments, XtremIO (available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having IO interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

In embodiments, data verification in a replication storage environment scans data between a source and target system and checks the data for accuracy and inconsistencies and to determine whether the data has been completely transferred from the originating system to the receiving system.

In embodiments, a snap set may be defined as a group of snapshot volumes that are created at certain point in time. The system ensures data consistency among the snap shot volumes within the same snap set.

It is envisioned that at least some embodiments herein are usable with embodiments described in commonly owned U.S. Pat. No. 9,104,326 ("Scalable Block Data Storage Using Content Addressing") (hereinafter "'326 patent"), which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1A:
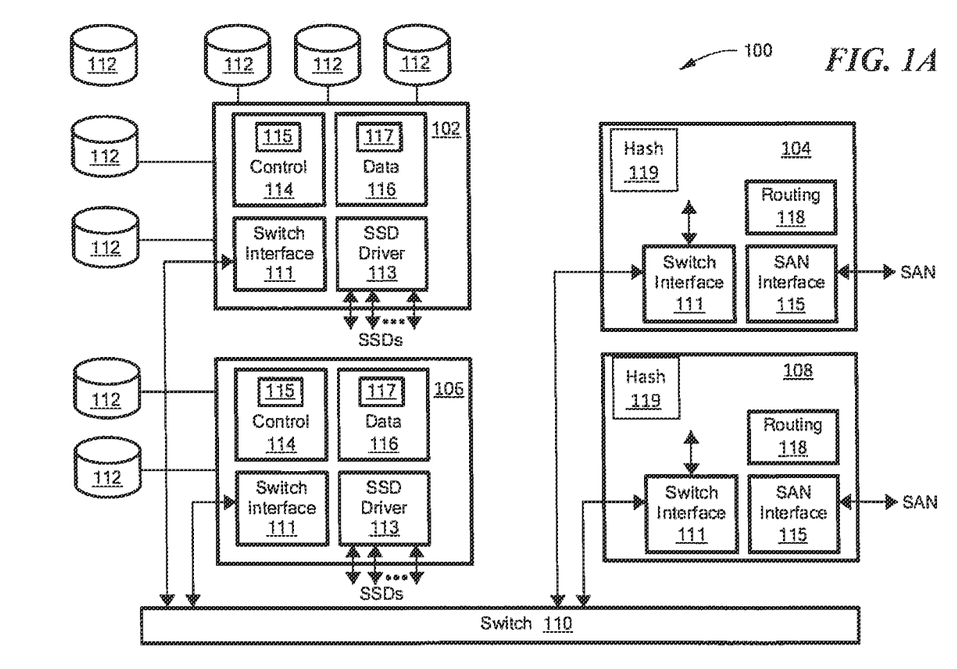
FIG. 1A is a block diagram of a content-based storage system having multi-level cache for deduplicated storage for supporting hash based xcopy replication for synchronous replication in an embodiment.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 104.

The routing systems 118 may use the hash values calculated from data blocks to select control systems 114 for distribution. More particularly, selection of the control system 114 may use hash values or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 1B:
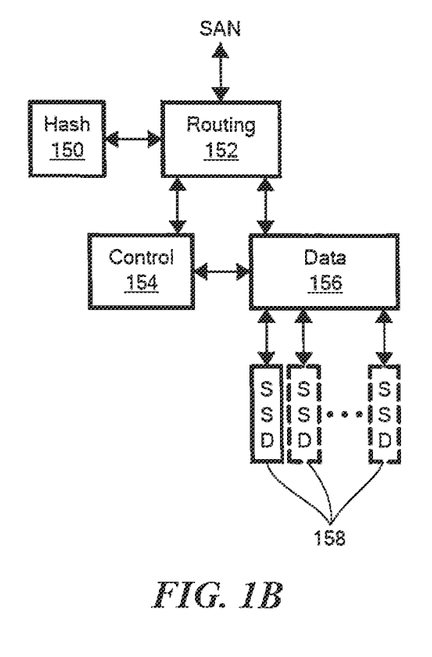
FIG. 1B illustrates further detail of the system of FIG. 1A.

FIG. 1B is an example of a system that can include a hash (H) system 150 communicatively coupled to a routing (R) system 152, which can be communicatively coupled to a control (C) system 154 and a data (D) system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

A function of the H module 150 is to calculate the Hash function value for a given block of data, e.g., data which is the subject of storage commands. The hash values calculated may later be used for retrieval. The Hash function may be based on standards based hash functions such as SHA-1 and MD5, or based on a proprietary function, but this is not limiting. The hash function is selected, in certain embodiments, to generate a uniformly distributed output over the range of potential input values. In certain embodiments, H modules 150 share nodes with an R module 152, but that is not limiting. More generally, the H modules 150 can reside in certain nodes, in all nodes, together with R modules 152, or together with C modules 154 or D modules 156.

A function of the R module 152 is to terminate storage area network (SAN) Read/Write commands and route them to appropriate C and D modules 154 and 156, for execution by these modules. By doing so, the R module 152 can distribute workload over multiple C and D modules 154, 156, and at the same time create complete separation of the Control and Data planes, that is to say provide separate control and data paths. In certain embodiments, the R module 152 routes SCSI IO request to the C modules 154, guarantees execution, and returns the result. In certain embodiments, the R module 152 maintains an up to date data structure called an address-to-control module (A→C or A2C) table, coordinated with the management back end (MBD), indicating which C module 154 is responsible for each logical X-page address (LXA), and also showing a balance a range of all possible LXAs between available C modules 154. In certain embodiments, for write operations, the R module 152 instructs the calculation of a hash digest for each X-page by requesting such calculation from a hash calculation module (e.g., the H module 150).

A function of the C module 154 is to control the execution of a Read/Write (R/W) command, as well as other storage functions implemented by the system. The C module 154 also may maintain and manage key metadata elements. In certain embodiments, the C module 154 receives an IO request from an R module 152 on a certain sub-LUN (SL), guaranteeing its atomic execution (i.e., execution independent of other processes) and returns the result to the R module 152. The C module 154 also communicates with D modules 156 to execute the IO requests. In addition, the C module 154 monitors the disk content of its logical space by associating each LXA with its hash digest; and balances the work load between the D modules for the SLs that the C module 154 is maintaining. The C module 154 and data module 156 each maintains certain data structures and corresponding metadata journals for those data structures. For example, the C module 154 maintains an "address to hash" table (A2H table, also referred to herein as A→H table) and corresponding A2H metadata journal, in the C module 154. The D module 156 maintains the "hash to physical location of data" table (H2P table, also referred to herein as H→P table) and its corresponding metadata journal in the D module 156. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 154 is responsible for, to the hash digest representing the X-page Data that currently resides in that address. The C module 154 maintains an A2H table in a persistent way. The C module 154 may initiate requests to D modules 156 in order to save table pages to disk and read them from disk. In addition, to avoid frequent disk operations, the C module 154 maintains a journal certain of the latest table operations. These journals include (but are not limited to) the A2H metadata journals (A2H Hash tree) and dirty tree update metadata journals. The dirty tree and corresponding functionality are described further in commonly assigned U.S. patent application Ser. No. 15/656,168 entitled "Online Metadata Backup Consistency Check," filed on Jul. 21, 2017, which is hereby incorporated by reference.

The data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals. For example, in certain embodiments, the metadata journals include information associated with time-based changes to information in the respective A2H and H2P tables and time-based changes to the disk block allocation bitmap.

The H2P table maps each range of hash digests to the corresponding D module 156 responsible for that range. The H2P table balances the range of all possible hash digests between the available D modules 156.

A function of the D module 156 is to perform the actual read/write (R/W) operation by accessing the storage devices 158 attached to it. The D module 156 may maintain metadata related with the physical location of data blocks. In certain embodiments, the D module 156 is responsible for: maintaining a set of LUNs which are attached locally and performing all IO operations on these LUN; managing the physical layout of the attached LUNs; managing the mapping between X-Page Data hash digests and their physical location in a persistent way; managing deduplication of X-Page Data in a persistent way; and receiving disk IO requests from C modules 154, perform them and returning a result.

In certain embodiments, the D module 156 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 156 maintains an up-to-date H→(D, $D_{backup}$) table coordinated with the MBE, where the H→(D, $D_{backup}$) table is expected to balance the range of all possible hash digests between the available D modules 156.

Balancing between the D modules is based on hashing of the content. For example, in certain embodiments, the D module 156 makes use of a hash digest metadata table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication. The D modules 156 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 156 occurs (due to a D module 156 failure for example), the D module 156 may communicate with other D modules 156 in order to create new backup copies or move a primary ownership as required.

The D modules 156 allow deduplication per X-Page Data by maintaining a persistent reference count that guarantees only one copy per X-Page Data. The D modules 156 manage the hash digest metadata table in a persistent way. The table is coordinated with the physical layout for physical pages allocation, with the memory pointer, memory backup pointer, and deduplication reference count.

As will be appreciated, the R, C, D, and H modules 150-156 may be implemented in software, and executed on a physical node. In addition, the aforementioned '326 patent provides information relating to additional functionality of the R, C, D, and H modules 150-156, in certain embodiments.

Figure 2:
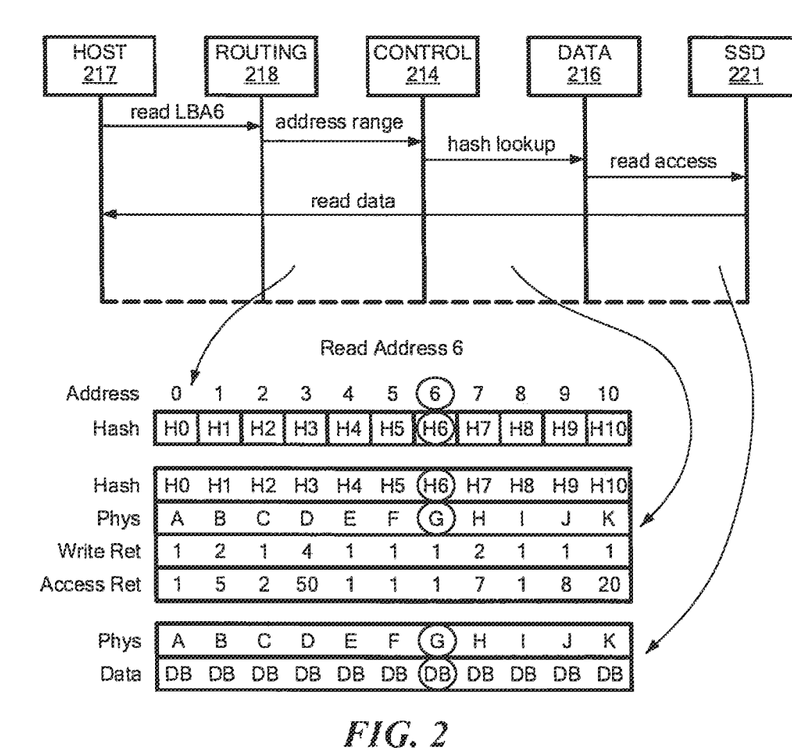
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup.

The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented.

If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
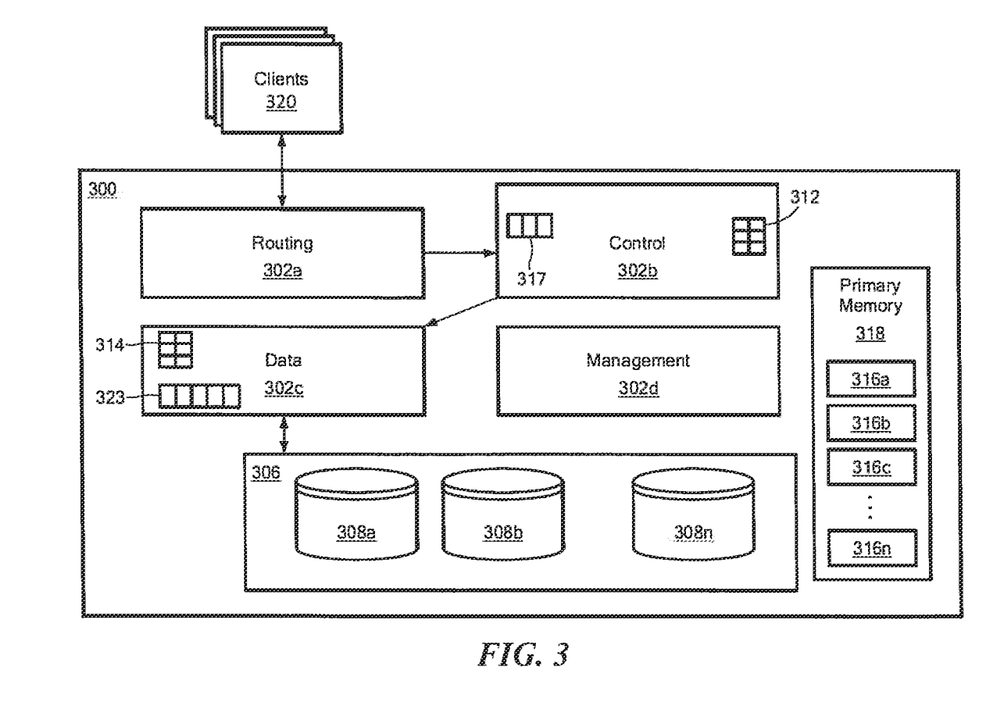
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between IO addresses associated with data and the corresponding chunk hashes. As shown in FIG. 3, this mapping may be maintained using a data structure 312, referred to herein as an "IO address to chunk hash mapping table" or "A2H table," (also known as A→H table) according to some embodiments. In one embodiment, IO addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
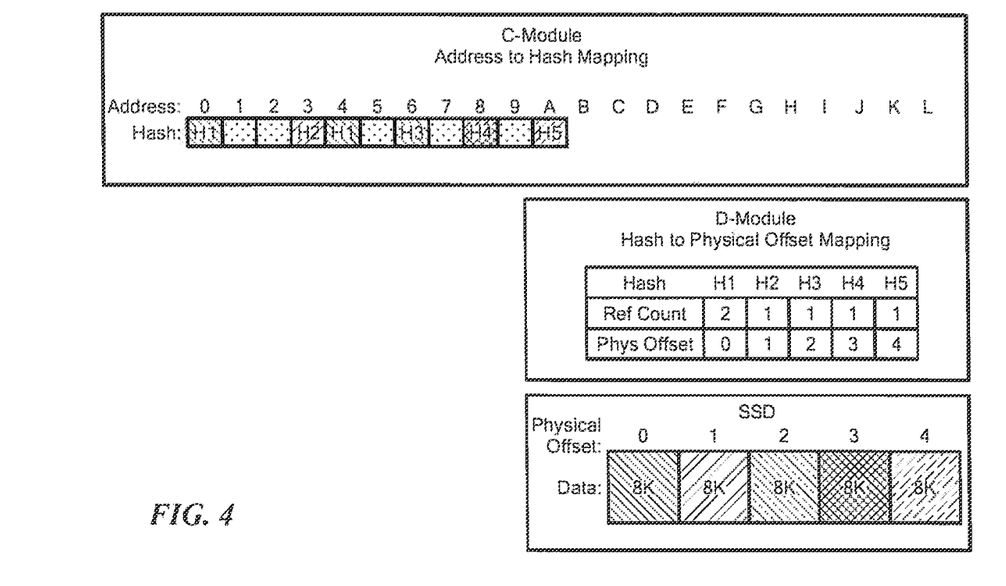
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Figure 5:
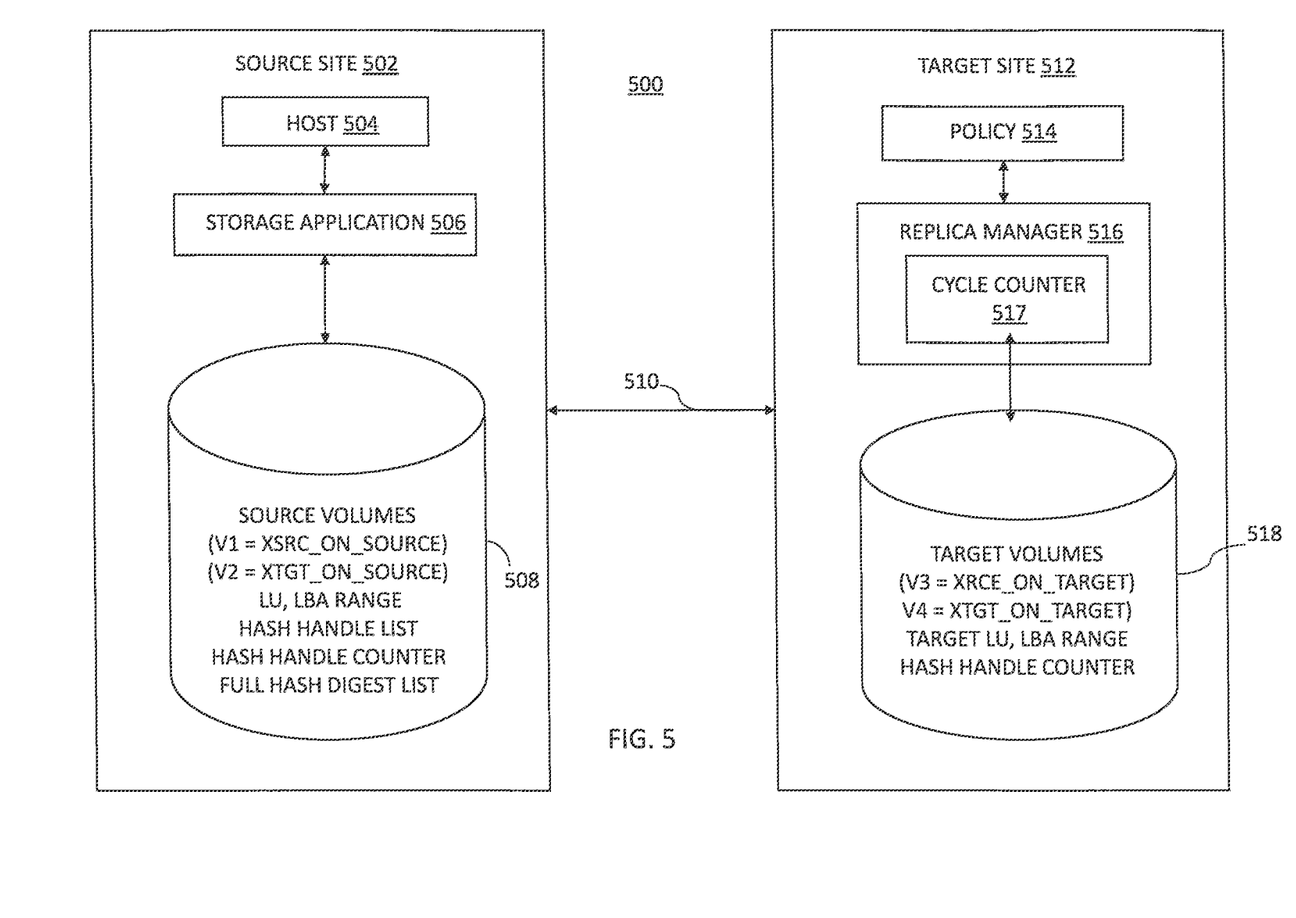
FIG. 5 is a simplified block diagram of a replication system for supporting hash based xcopy replication for synchronous replication in accordance with an embodiment.

Turning now to FIG. 5, an example storage system 500 for supporting hash based xcopy replication for synchronous replication will now be described. The storage system 500 and/or various components thereof, may be implemented, e.g., via one or more above-described systems (e.g., FIGS. 1 and 3). Storage system 500 may include at least one source site 502 and at least one target site 512. In an embodiment, target site 512 is either co-located with source site 502 or is in close geographic proximity (e.g., within the same building or building complex) with the source site 502. In other embodiments, target site 512 is remotely located from the source site 502. For example, target site 512 may be geographically dispersed across cities, states, or even countries with respect to source site 502.

Source site 502 may include a host 504, storage application 506, and data storage 508. In some embodiments, storage 508 may include one or more storage volumes (e.g., production volumes), that operate as active, or production, volumes. In embodiments, storage 508 may store source logical units (LUs), source logical block addresses (LBAs), a hash handle list, a hash handle counter, and a full hash digest list. In embodiments, storage 518 on the target site 512 include target volumes, target LUs, target LBA ranges, and hash handle counter.

Host 504 may perform IO operations on storage 508 (e.g., read data from and write data to storage 508). In some embodiments, the IO operations may be intercepted by and controlled by the storage application 506. As changes are made to data stored on storage 508 via the IO operations from host 504, or over time as storage system 500 operates, storage application 506 may perform data replication from the source site 502 to the target site 512 over a communication network 510. In some embodiments, the communication network 510 may include internal (e.g., short distance) communication links (not shown) to transfer data between storage volumes for storing replicas, such as an InfiniBand (IB) link or Fibre Channel (FC) link. In other embodiments, the communication link 510 may be a long-distance communication network of a storage area network (SAN), e.g., over an Ethernet or Internet (e.g., TCP/IP) link that may employ, for example, the iSCSI protocol.

In illustrative embodiments, storage system 500 may employ a replication mechanism to replicate data between source site 502 and target site 512. A replica may be created from data within storage 508 and transferred to the target site 512 during a data replication cycle by data replication.

Data replication may be performed based on data replication policies that may define various settings for data recovery operations, shown as policy 514 in target site 512. For example, policy 514 may define a plurality of attributes, such as a frequency with which replicas are generated and how long each replica 518 is kept at target site 512. In some embodiments, policy 514 defines metrics for use in snap set creation and replication process determinations.

In addition to managing replicas 518 according to a policy 514 (e.g., a replication and/or retention policy), the replica manager 516 may also include a cycle counter 517 to track generations of snap sets over time.

It will be understood that the roles of the source site 502 and the target site 512 may be reversed in instances, e.g., in which an event occurring on the source site 502 causes the target site 512 to intercept IOs and take on the role of snap set creation and replication to the source site. This role reversal is referred to as a failover event. In this manner, the processes described herein apply equally to the target site. In this instance, the source site 502 becomes the new target site, and the target site 512 becomes the new source site, as shown in FIG. 5.

As indicated above, synchronous replication is a business continuity process that mirrors data updates between two systems to prevent data loss and downtime. When sync replication is turned on for a production storage object, the system mirrors the data from source to target system as part of handling write requests from initiator and only responds to initiator after the writes have been persisted on both source and target system.

SCSI Extended Copy (xcopy) refers to an SCSI command that offloads copy operations from a host to storage. In particular, an initiator specifies a source LU, source LBA range, target LU, and target LBA range, in extended copy command, and then the target system executes the command by copying data from the source to the target. The data is hash handle data and includes <LU, offset, length>. In cases that require copying a large amount of data such as cloning virtual machines, this can significant IO bandwidth and host CPU processing.

The fact that synchronous replication combines IO flows on two independent systems, and xcopy commands may involve two independent storage volumes, plus the potential large LBA ranges that may be covered by the single xcopy command, bring complexity of supporting xcopy in synchronous replication, and the potential for out of sync between source and target storage content.

The embodiments described here provide an efficient way to support xcopy commands when synchronous replication is enabled using a hash-based mechanism. To support xcopy with synchronous replication, both source and target LUs need to be synchronously replicated to the same target system. If the source LU is not replicated, there is a chance that the data on the source LU may not reside in the target system, thus may trigger large amounts of data transfer between two storage systems and may take much longer time than expected had the LBA range needed to be copied. If the target LU is not in sync replication, there is nothing that will need to be done from the replication point of view.

Techniques for performing sync replication include sending, by a source site a short hash handle to a target site. If the hash handle exists on the target site, then the chance of the full digest existing on the target is high. In this case, the process may send the full digest to the target. It is also highly likely that the full digest also exists on the target, in which case the process is completed. However, if the full digest does not exist on the target, the full data page maybe sent from the source to the target. If the hash handle does not exist on the target, then this means that the full digest does not exist target. In this instance, the full digest page is sent from the source to the target. In this process, the short hash handle is sent first because of the cost of sending the short hash handle and the full digest is less than the cost of sending the full page. In addition, the short hash handle is sent first because the cost of sending the short hash handle is less than the cost of sending the full digest. Thus, the short hash handle is used as a filter to decide whether the next step will be to send the full digest or the full page.

As indicated above, an optimization of the process may be implemented if both volumes of the xcopy exist on the same target. As shown in FIG. 5 by way of illustration, it is assumed that four volumes are stored in the system. Volumes 1 and 2 are stored on the source site as xsrc_on_source and xtgt_on_source, respectively, and volumes 3 and 4 are stored on the target site as xsrc_on_target and xtgt_on_target, respectively.

Xsrc_on_source means the source volume of xcopy resides on the source cluster. Xtgt_on_source means the target volume of xcopy resides on the source cluster. Xsrc_on_target means the source volume of xcopy on target cluster. Xtgt_on_target means the target volume of xcopy on target cluster. Xsrc_on_source, and xsrc_on_target are a first replication pair. Xtgt_on_source and xtgt_on_target are another replication pair.

In addition, xcopy indicates copy xsrc_on_source to xtgt_on_source. Also, xcopy indicates xsrc_on_target to xtgt_on_target. Since (xsrc_on_source, xsrc_on_target) is a replication pair, when xcopying data from xsrc_on_source to xtgt_on_source, the xsrc_on_target already has the same data as xsrc_on_source (because they are sync replicated). Also, when xcopying data from xsrc_on_source to xtgt_on_source, since xtgt_on_source and xtgt_on_target is a sync replication pair, xtgt_on_target needs to be updated when xtgt_on_source is updated. The embodiments described herein enable optimization of sync replication in this instance. Since xsrc_on_target is already the same as xsrc_on_source, when xtgt_on_source is updated to be same as xsrc_on_source, the full digest is already on xsrc_on_target since xsrc_on_target is same as xsrc_on_source. Because of this, when sync rep is performed from xtgt_on_source to xtgt_on_target, the short hash handle described above does not need to be sent, as the reason it is typically needed is to check whether the full digest or full data page should be sent. In the optimized xcopy case, since most likely (almost always true other than a strange edge case) the full digest already exists on target cluster, we the step of sending short hash handle can be skipped and the full digest can be sent.

Figure 6:
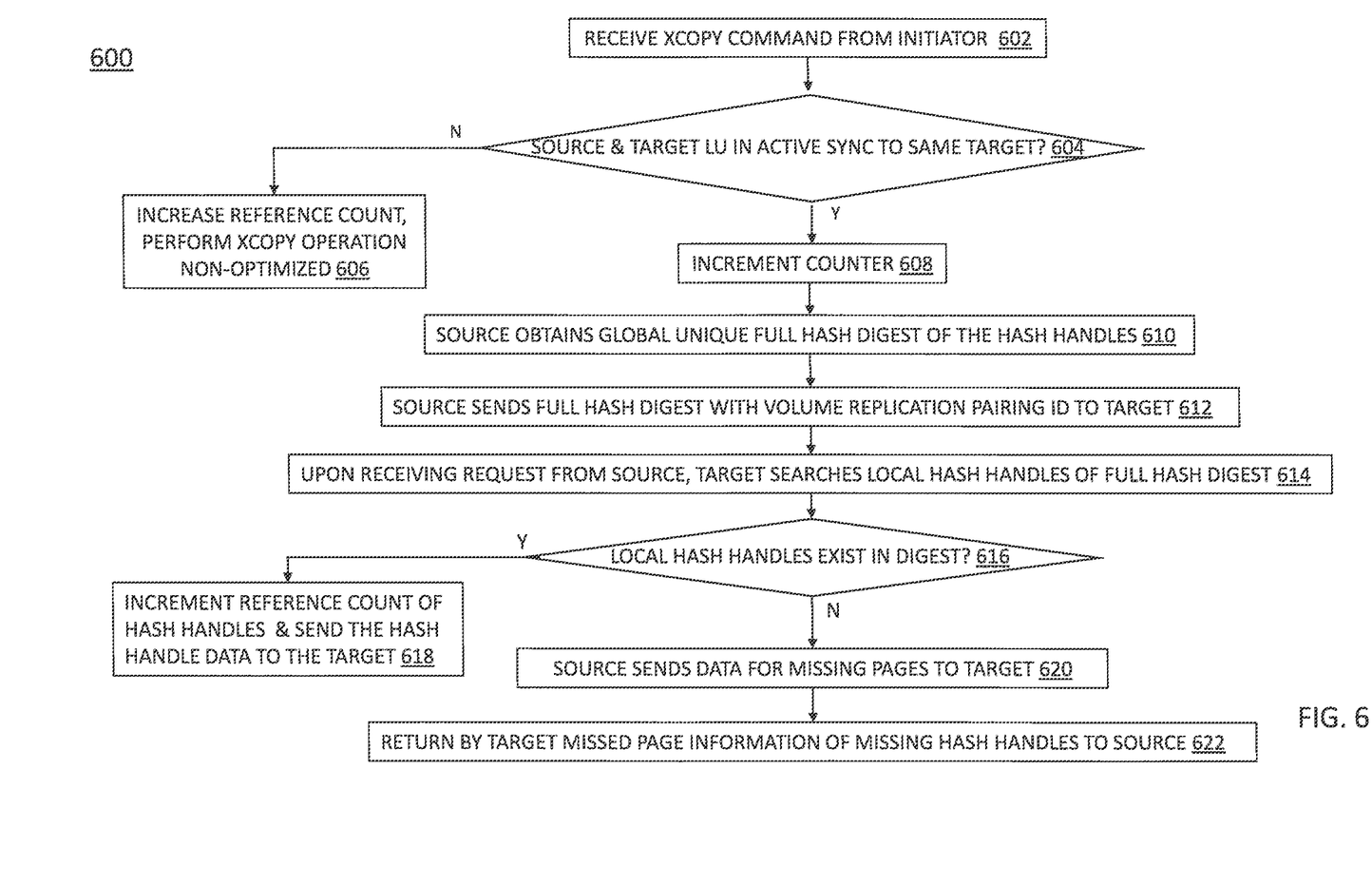
FIG. 6 is a flow diagram of a process for supporting hash based xcopy replication for synchronous replication in accordance with an embodiment.

Turning now to FIG. 6, a process 600 for supporting hash based xcopy replication for sync replication will now be described. Given that, xcopy can be supported in a similar manner as write sync replication, upon receiving an xcopy command at the source site, the process 600 includes receiving an xcopy command at the source site from an initiator at block 602. In the process 600 of FIG. 6, optimized processing of the xcopy command is performed if both the source site LU and target LU are in active sync to the same target. If they are not in sync, then the xcopy command is implemented using standard techniques. Thus, in block 604, the process 600 determines whether both the source site logical unit (LU) and the target site LU are in active synchronous replication to the same target site.

If the source site LU and target site LU are not in active sync for the same target in block 604, the counter is incremented in block 606, and standard processing (non-optimized) of the xcopy command is performed. For example, standard processing may include obtaining by the source site hash handles from a hash handle list at the source site (LU, offset, length). The hash handles include <LU, offset, and length>. Standard processing of the xcopy command may also include sending, via the source site, the hash handles to the target site (LU, offset, length).

Returning to block 604, if the source site LU and the target site LU are in active sync for the same target, the process 600 includes incrementing the counter in block 608 and obtaining, by the source site, a global unique full hash digest of the hash handles in block 610. In block 612, the process 600 includes sending, via the source site, the full hash digest with volume replication pairing identifier, offset, and length to the target site.

In block 614, the process 600 includes, upon receiving a request from the source site, searching, via the target site, for local hash handles of the full hash digest. In block 616, the process 600 determines whether the local hash handles exist in the full hash digest. If so, the process 600 includes incrementing, via the target site, a reference counter of the hash handles in block 618 and setting the hash handles to the target site (LU, offset, length). The source site sends an acknowledgement message to the initiator.

Returning to block 616, if the local hash handles do not exist in the full hash digest, the process 600 includes returning, via the target site, missed page information of missing hash handles to the source site in block 620, and in block 622, the process 600 sends, via the source site, the missed page information to the target site.

Figure 7:
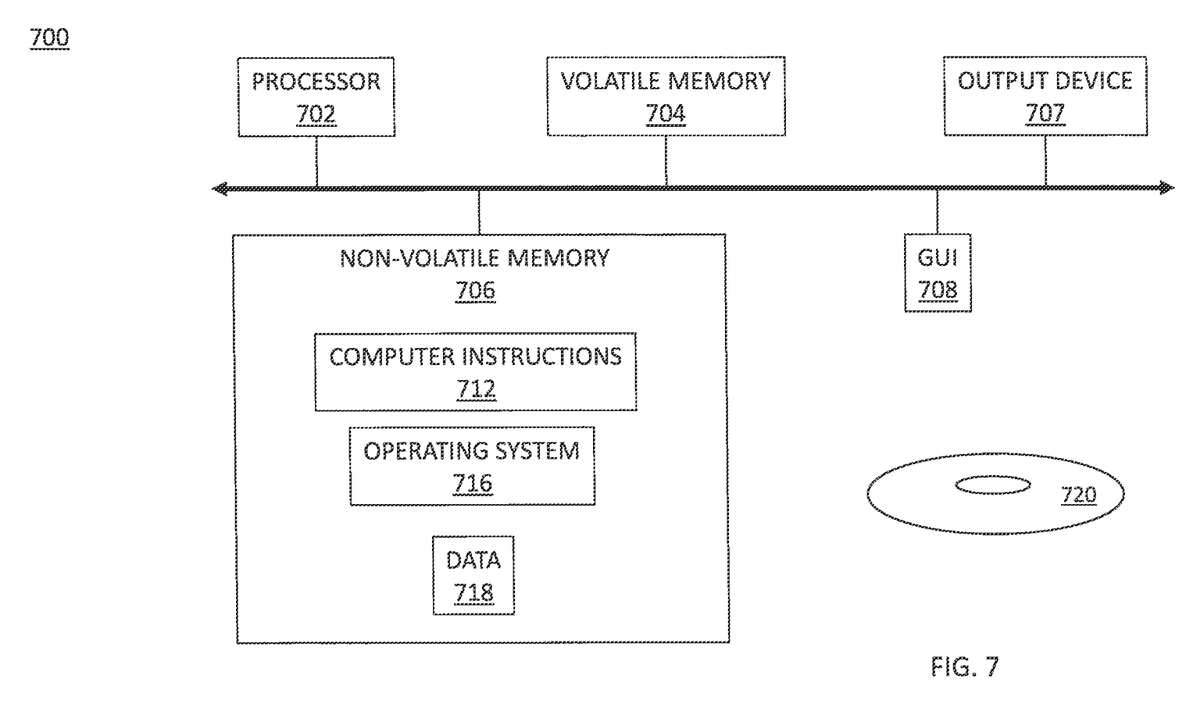
FIG. 7 is a block diagram of an illustrative computer that can perform at least a portion of the processing described herein.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for supporting hash-based, extended copy (xcopy) command-enabled synchronous replication at a storage system that includes a source site and a target site, the method comprising:
   determining, in response to receiving an xcopy command at the source site, whether the source site and the target site are in active synchronous replication to a same target; and
   upon determining that the source site and the target site are in active synchronous replication to the same target:
   sending, by the source site, a global unique full hash digest to the target site;
   searching, by the target site, for local hash handles of the global unique full hash digest; and
   upon determining the local hash handles exist in the global unique full hash digest, sending corresponding hash handles from the source site to the target site.

2. The method of claim 1, wherein upon determining the local hash handles do not exist in the global unique full hash digest, returning by the target site, information of missing hash handles to the source site.

3. The method of claim 2, in response to receiving the information of the missing hash handles from the target site, sending by the source site, missing page information corresponding to the missing hash handles to the target site.

4. The method of claim 1, wherein upon determining the local hash handles exist in the global unique full hash digest, the method further includes:
   incrementing, by the target site, a reference count of a hash handle list before sending the corresponding hash handles to the target site.

5. The method of claim 1, wherein sending the global unique full hash digest to the target site includes sending a volume replication pairing identifier, an offset, and a length.

6. The method of claim 1, wherein upon determining that the source site and the target site are in active synchronous replication to the same target, the method further comprises:
   incrementing, by the source site, a reference count of a hash handle list.

7. The method of claim 1, further comprising:
   upon determining that the source site and the target site are not in active synchronous replication to the same target, obtaining hash handles corresponding to the xcopy command by the source site from a hash handle list at the source site and sending the hash handles to the target site.

8. The method of claim 7, wherein the hash handles to the target site include a logical unit, an offset, and a length.

9. A system for supporting hash-based, extended copy (xcopy) command-enabled synchronous replication at a storage system including a source site and a target site, the system comprising:
   a memory comprising computer-executable instructions; and
   a processor operable by the storage system, the processor executing the computer-executable instructions, the computer-executable instructions when executed by the processor cause the processor to perform operations comprising:
   determining, in response to receiving an xcopy command at the source site, whether the source site and the target site are in active synchronous replication to a same target; and
   upon determining that the source site and the target site are in active synchronous replication to the same target:
   sending, by the source site, a global unique full hash digest to the target site;
   searching, by the target site, for local hash handles of the global unique full hash digest; and
   upon determining the local hash handles exist in the global unique full hash digest, sending corresponding hash handles from the source site to the target site.

10. The system of claim 9, wherein upon determining the local hash handles do not exist in the global unique full hash digest, the operations further include returning by the target site, information of missing hash handles to the source site.

11. The system of claim 10, in response to receiving the information of the missing hash handles from the target site, sending by the source site, missing page information corresponding to the missing hash handles to the target site.

12. The system of claim 9, wherein upon determining the local hash handles exist in the global unique full hash digest, the operations further include:
   incrementing, by the target site, a reference count of a hash handle list before sending the corresponding hash handles to the target site.

13. The system of claim 9, wherein sending the global unique full hash digest to the target site includes sending a volume replication pairing identifier, an offset, and a length.

14. The system of claim 9, wherein upon determining that the source site and the target site are in active synchronous replication to the same target, the operations further include:
   incrementing, by the source site, a reference count of a hash handle list.

15. The system of claim 9, wherein the operations further include:
   upon determining that the source site and the target site are not in active synchronous replication to the same target:
   obtaining hash handles corresponding to the xcopy command by the source site from a hash handle list at the source site; and
   sending the hash handles to the target site;
   wherein the hash handles to the target site include a logical unit, an offset, and a length.

16. A computer program product for supporting hash-based, extended copy (xcopy) command-enabled synchronous replication at a storage system, the computer program product embodied on a non-transitory computer readable medium, the computer program product including instructions that, when executed by a computer, causes the computer to perform operations comprising:
   determining, in response to receiving an xcopy command at the source site, whether the source site and the target site are in active synchronous replication to a same target; and
   upon determining that the source site and the target site are in active synchronous replication to the same target:
   sending, by the source site, a global unique full hash digest to the target site;
   searching, by the target site, for local hash handles of the global unique full hash digest; and
   upon determining the local hash handles exist in the global unique full hash digest, sending corresponding hash handles from the source site to the target site.

17. The computer program product of claim 16, wherein the operations further include:
   upon determining the local hash handles do not exist in the global unique full hash digest, returning by the target site, information of missing hash handles to the source site; and
   in response to receiving the information of the missing hash handles from the target site, sending by the source site, missing page information corresponding to the missing hash handles to the target site.

18. The computer program product of claim 16, wherein upon determining the local hash handles exist in the global unique full hash digest, the operations further include:
   incrementing, by the target site, a reference count of a hash handle list before sending the corresponding hash handles to the target site.

19. The computer program product of claim 16, wherein sending the global unique full hash digest to the target site includes sending a volume replication pairing identifier, an offset, and a length.

20. The computer program product of claim 16, wherein upon determining that the source site and the target site are in active synchronous replication to the same target, the operations further include:
   incrementing, by the source site, a reference count of a hash handle list.

* * * * *